(12) United States Patent
Lee et al.

(10) Patent No.: US 12,337,729 B2
(45) Date of Patent: Jun. 24, 2025

(54) APPARATUS FOR TILTING SEAT CUSHION OF VEHICLE

(71) Applicants: Hyundai Motor Company, Seoul (KR); Kia Corporation, Seoul (KR); DAS CO., LTD, Gyeongju-si (KR); Faurecia Korea, Ltd., Yongin-si (KR); Hyundai Transys Inc., Seosan-si (KR)

(72) Inventors: Sang Soo Lee, Whasung-Si (KR); Mu Young Kim, Whasung-Si (KR); Sang Hark Lee, Whasung-Si (KR); Ho Suk Jung, Whasung-Si (KR); Sang Do Park, Whasung-Si (KR); Chan Ho Jung, Whasung-Si (KR); Dong Hoon Lee, Whasung-Si (KR); Hea Yoon Kang, Whasung-Si (KR); Deok Soo Lim, Whasung-Si (KR); Seung Pil Jang, Whasung-Si (KR); Seon Ho Kim, Whasung-Si (KR); Jong Seok Yun, Whasung-Si (KR); Hyo Jin Kim, Whasung-Si (KR); Dong Gyu Shin, Whasung-Si (KR); Jin Ho Seo, Whasung-Si (KR); Young Jun Kim, Whasung-Si (KR); Taek Jun Nam, Whasung-Si (KR)

(73) Assignees: Hyundai Motor Company, Seoul (KR); Kia Corporation, Seoul (KR); DAS CO., LTD, Gyeongju-si (KR); Faurecia Korea, Ltd., Yongin-si (KR); Hyundai Transys Inc., Seosan-si (KR)

( * ) Notice: Subject to any disclaimer, the term of this patent is extended or adjusted under 35 U.S.C. 154(b) by 231 days.

(21) Appl. No.: 18/134,393

(22) Filed: Apr. 13, 2023

(65) Prior Publication Data
US 2024/0075853 A1 Mar. 7, 2024

(30) Foreign Application Priority Data

Sep. 6, 2022 (KR) .................. 10-2022-0112862

(51) Int. Cl.
*B60N 2/12* (2006.01)
*B60N 2/02* (2006.01)
(Continued)

(52) U.S. Cl.
CPC ........... *B60N 2/10* (2013.01); *B60N 2/02246* (2023.08); *B60N 2/02253* (2023.08); *B60N 2/165* (2013.01)

(58) Field of Classification Search
CPC . B60N 2/02246; B60N 2/02253; B60N 2/165
See application file for complete search history.

(56) References Cited

U.S. PATENT DOCUMENTS 3,712,573 A * 1/1973 Pickles ................ B60N 2/0224
248/394
5,882,061 A * 3/1999 Guillouet ................. B60N 2/43
297/344.15 X (Continued)

FOREIGN PATENT DOCUMENTS

| KR | 10-2018-0002299 | 1/2018 |
| KR | 10-2235731 | 4/2021 |

*Primary Examiner* — Rodney B White
(74) *Attorney, Agent, or Firm* — Morgan, Lewis & Bockius LLP

(57) ABSTRACT

An apparatus of tilting a seat cushion of a vehicle, includes a tilting motor, a pinion gear, a sector gear, and a tilting link which perform the tilting operation of the seat cushion and exert a binding force in a tilted state of the seat cushion and are provided to be connected to both of one side and the other side of a seat cushion frame, and has two sector gears positioned on left and right sides and connected to each other by a connection bar so that, by strengthening a binding force (Continued)

of the front portion of the seat cushion, it is possible to secure the safety of passengers in the event of a collision.

10 Claims, 7 Drawing Sheets

(51) Int. Cl.
*B60N 2/10* (2006.01)
*B60N 2/16* (2006.01)

(56) References Cited

U.S. PATENT DOCUMENTS

| | | | | |
|---|---|---|---|---|
| 6,902,234 B2* | 6/2005 | Becker | ................... | B60N 2/165 |
| | | | | 297/344.15 X |
| 8,366,194 B2* | 2/2013 | Yamamoto | ........... | B60N 2/1821 |
| | | | | 297/344.15 X |
| 8,550,554 B2* | 10/2013 | Asakura | ............... | B60N 2/1615 |
| | | | | 297/216.2 |
| 8,596,721 B2* | 12/2013 | Ozawa | ................. | B60N 2/1615 |
| | | | | 297/344.15 X |
| 8,616,636 B2* | 12/2013 | Arata | ................... | B60N 2/1615 |
| | | | | 297/344.15 X |
| 8,616,645 B2* | 12/2013 | Ito | ....................... | B60N 2/1842 |
| | | | | 297/344.17 |
| 9,902,295 B2* | 2/2018 | Napau | ................... | B60N 2/1867 |
| 9,944,203 B2* | 4/2018 | Kishida | ............... | B60N 2/42709 |
| 10,195,975 B2* | 2/2019 | Becker | ................... | F16H 1/32 |
| 10,207,599 B2* | 2/2019 | Yagi | ....................... | B60N 2/1635 |
| 10,220,728 B2* | 3/2019 | Takada | ................... | B60N 2/10 |
| 10,293,709 B2 | 5/2019 | Murakami et al. | | |
| 10,406,944 B2* | 9/2019 | Ishihara | ................. | B60N 2/165 |
| 10,640,023 B2 | 5/2020 | Zhang et al. | | |
| 10,668,835 B2* | 6/2020 | Hirata | ................... | B60N 2/165 |
| 11,173,813 B2* | 11/2021 | Sekizuka | ................ | B60R 22/26 |
| 11,180,055 B2* | 11/2021 | Aktas | ................... | B60N 2/2213 |
| 11,260,776 B1* | 3/2022 | Aktas | ................. | B60N 2/02246 |
| 11,332,042 B2* | 5/2022 | Aktas | ....................... | B60N 2/3065 |
| 11,332,050 B1* | 5/2022 | Aktas | ....................... | B60N 2/22 |
| 11,351,891 B2 | 6/2022 | Bouzid et al. | | |
| 11,400,836 B2* | 8/2022 | Epaud | ................... | B60N 2/943 |
| 12,024,066 B2* | 7/2024 | Kim | ..................... | B60N 2/1625 |
| 12,090,895 B2* | 9/2024 | Kapusky | ............ | B60N 2/02246 |
| 2018/0066736 A1* | 3/2018 | Ito | ............................ | F16H 1/203 |
| 2021/0206296 A1* | 7/2021 | Ultsch | .................. | B60N 2/0276 |
| 2022/0118889 A1* | 4/2022 | Susko | ................... | B60N 2/3072 |
| 2022/0314843 A1* | 10/2022 | Roche | ..................... | B60N 2/309 |
| 2023/0249586 A1* | 8/2023 | Ploch | ..................... | B60N 2/12 |
| | | | | 297/330 |
| 2024/0123873 A1* | 4/2024 | Runde | ................ | B60N 2/02253 |
| 2024/0270126 A1* | 8/2024 | Kim | ........................ | B60N 2/12 |

\* cited by examiner

APPARATUS FOR TILTING SEAT CUSHION OF VEHICLE

CROSS REFERENCE TO RELATED APPLICATION

The present application claims priority to Korean Patent Application No. 10-2022-0112862 filed on Sep. 6, 2022, the entire contents of which is incorporated herein for all purposes by this reference.

BACKGROUND OF THE PRESENT DISCLOSURE

Field of the Present Disclosure

The present disclosure relates to an apparatus of tilting a seat cushion of a vehicle, and more particularly, to a technology for an apparatus of tilting a seat cushion of a vehicle, which is configured for reducing the injuries of passengers in a collision accident by strengthening a binding force of a front portion of the seat cushion.

Description of Related Art

Generally, a seat of a vehicle is a component including a seatback for supporting an upper body of a passenger, a seat cushion for supporting a lower body of the passenger, and a headrest for supporting a head of the passenger, and the seatback and the seat cushion have frame structures by a seatback frame and a seat cushion frame, respectively.

A passenger can relax in a comfortable posture by adjusting an angle of the seat.

For example, the passenger accommodated on the seat can take a rest in a posture which reduces burdens on the joints and balances the body by optimizing angles of an upper body, thigh, and calf. Such a seat sitting posture may be defined as a zero gravity neutral posture, a relaxation comfort posture, or a fatigue reduction posture.

The zero gravity neutral posture is a posture capable of reducing fatigue by relieving and distributing a concentrated body pressure even when the accommodated passenger maintains the same posture for a long time period, and a state in which a lower body angle between a thigh and a calf is maintained at an angle between 28 and 32 degrees in the accommodated state, an angle between the upper body and the lower body is maintained at an angle between 105 and 120 degrees, and an angle of the upper body with respect to a horizontal direction is maintained at an angle of 32 to 47 degrees may defined as corresponding to the zero gravity neutral posture.

To implement the zero gravity neutral posture, a tilting operation of the seat cushion is required, and the tilting operation of the seat cushion may be implemented as a front portion of the seat cushion is rotated to move upward about a hinge point of a rear portion.

A motor, a gear mechanism and a link mechanism are required for the tilting operation of the seat cushion, and the motor and the gear mechanism not only serve to tilt the seat cushion, but also serve to exert a binding force after the tilting to maintain the tilted state.

However, generally, the motor and the gear mechanism which exert the binding force in a tilted state are provided only on one side of the seat cushion and the motor and the gear mechanism which exert the binding force are not provided on the other side of the seat cushion. In place of the motor and the gear mechanism, only a link mechanism being rotated during a tilting operation is provided, and thus a one-sided structure in which the binding force of the front portion of the seat cushion is present only on one side is predominant.

Such a conventional structure has a disadvantage in that the binding force of the front portion of the seat cushion is weak, and in particular, the other side of the seat cushion, which cannot exert the binding force in the event of a crash, is excessively lifted upward and the seatback is excessively rotated so that the injuries of passengers are increased and thus there is a disadvantage in terms of passenger safety.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing apparatus of tilting a seat cushion of a vehicle, which has a structure in which both of a motor and a gear mechanism which perform a tilting operation of the seat cushion and exert a binding force in a tilted state are provided on a first side and a second side of the seat cushion and which, through the structure, achieves reinforcement of the binding force of a front portion of the seat cushion and is configured for preventing excessive lifting of the seat cushion and excessive rotation of the seatback in the event of a collision to reduce the injuries of passengers.

According to one aspect, there is provided an apparatus of tilting a seat cushion of a vehicle, which includes a tilting motor, a pinion gear coupled to the tilting motor, and a sector gear engaged to the pinion gear, wherein the tilting motor, the pinion gear, and the sector gear are configured to implement a tilting operation of the seat cushion and which are provided to be connected to left and right sides of a seat cushion frame, respectively, wherein, when the tilting motor is operated, a tilting operation of the seat cushion is implemented as a front end portion of the seat cushion frame is rotated to be moved up and down about a rear hinge shaft disposed at rear side of the seat cushion frame.

The tilting motor may be positioned on each of left and right sides of the seat cushion frame and may be coupled to a motor bracket, the motor bracket may be coupled to the front set bracket and the rear set bracket in a front and rear direction, and the front set bracket and rear set bracket may be coupled to a seat rail to be spaced from each other in the front and rear direction thereof.

The pinion gear may be coupled to the tilting motor positioned on each of the left and right sides of the seat cushion frame, and the sector gear may be engaged with the pinion gear on each of the left and right sides of the seat cushion frame.

The apparatus may further include a pair of tilting links rotatably connecting the sector gear to the seat cushion frame on the left and right sides of the seat cushion frame.

The apparatus may further include a connection bar extending below the seat cushion frame in a left and right direction and including first and second end portions provided to connect the sector gears.

The connection bar may be provided between the two sector gears positioned on the left and right sides of the seat cushion frame.

Positions where both the end portions of the connection bar are coupled to the sector gears may be the concentrically same position.

A connection bar mounting bracket may be fixedly coupled to an internal side surface of the sector gear, and both the end portions of the connection bar may be fixedly coupled to the connection bar mounting bracket.

A connection bar coupling hole may be formed to pass through the sector gear in the left and right direction, and both the end portions of the connection bar may be inserted into the connection bar coupling hole to be engaged with the sector gear.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
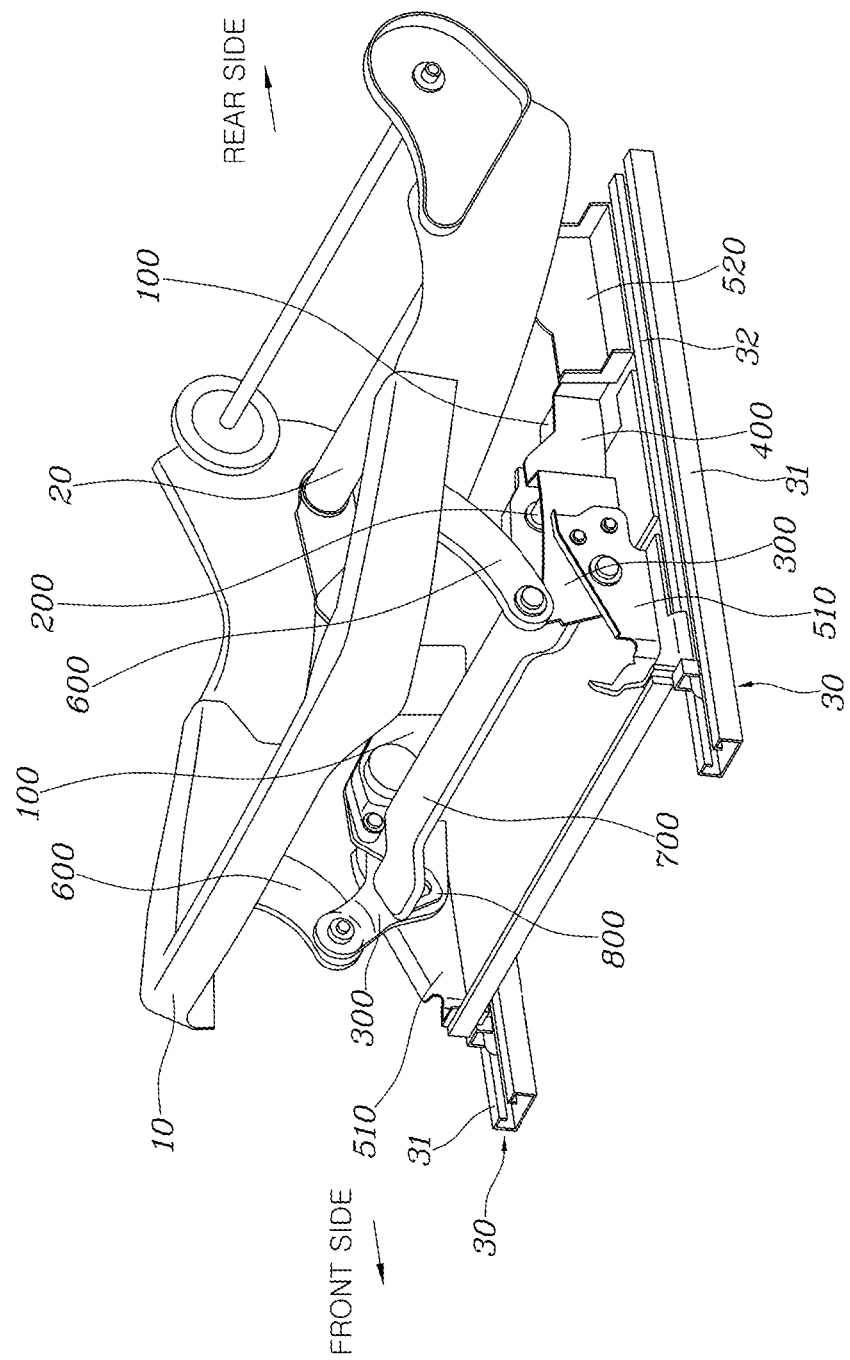
FIG. 1 and FIG. 2 are perspective views exemplarily illustrating a seat cushion frame including a tilting apparatus according to an exemplary embodiment of the present disclosure.
Figure 2:
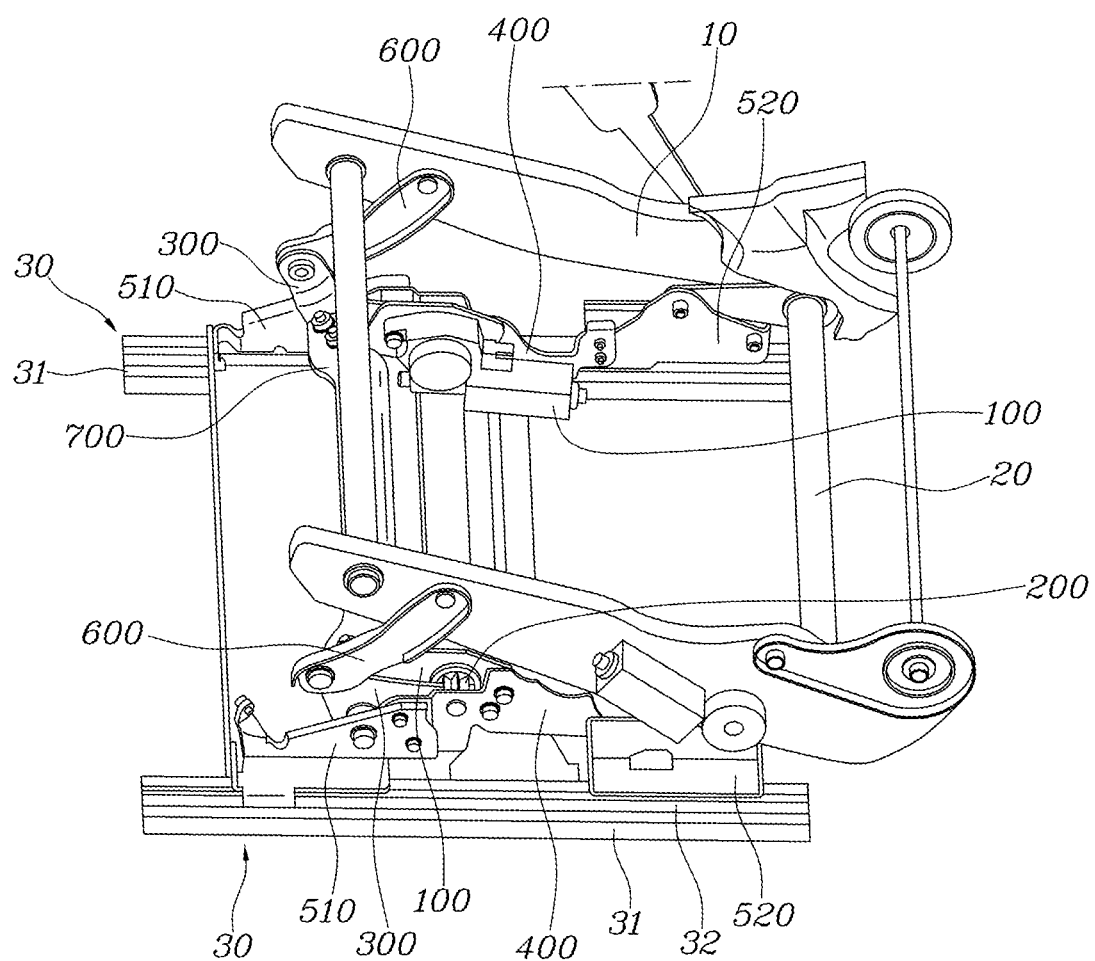
Figure 3:
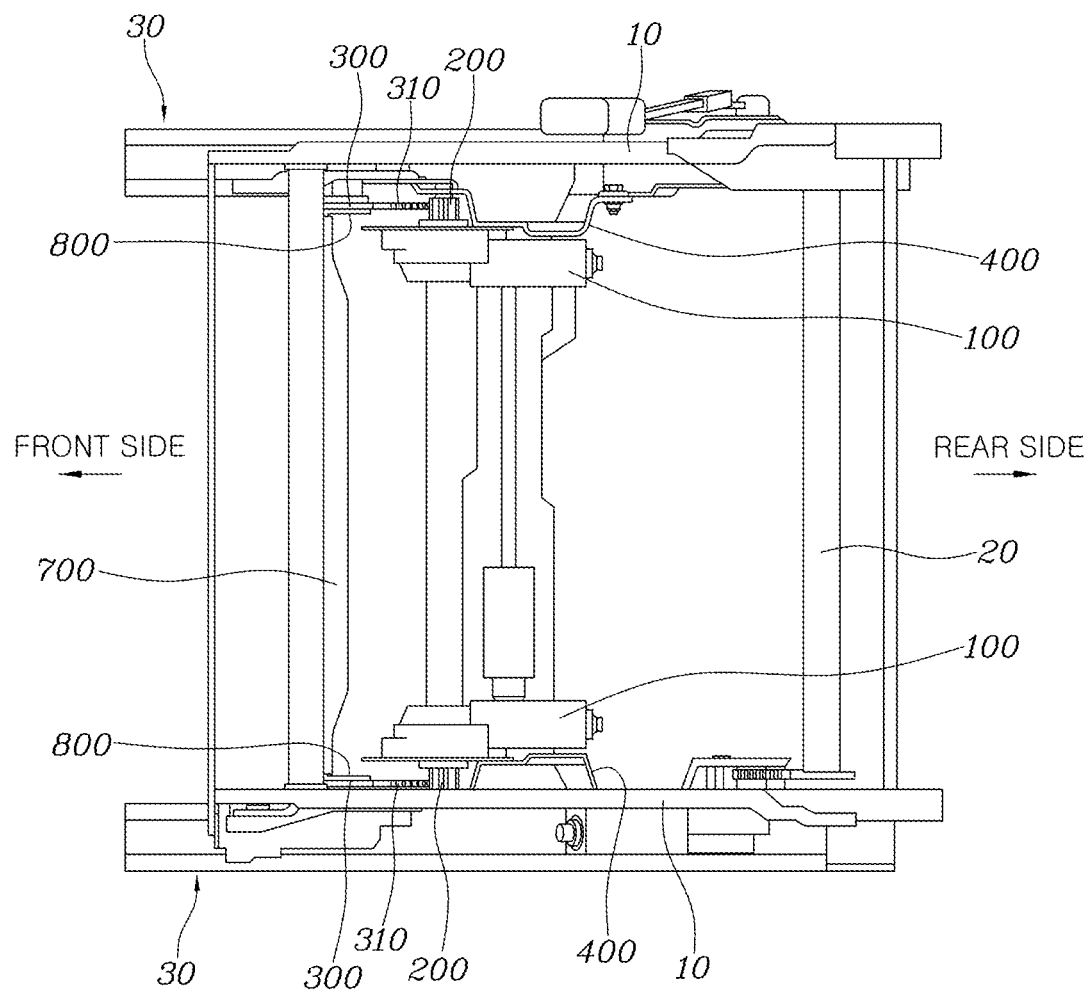
FIG. 3 is a plan view of FIG. 1.
Figure 4:
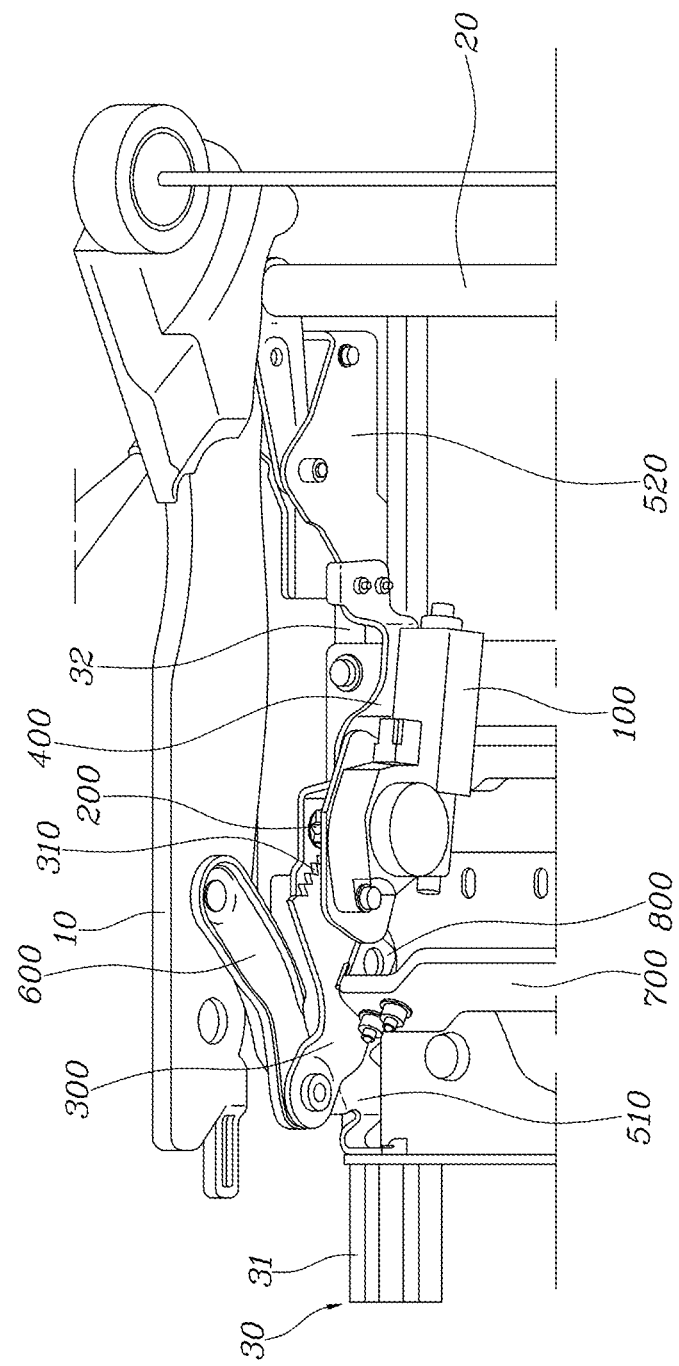
FIG. 4 is an enlarged view exemplarily illustrating a portion to which the tilting apparatus according to an exemplary embodiment of the present disclosure is coupled.
Figure 5:
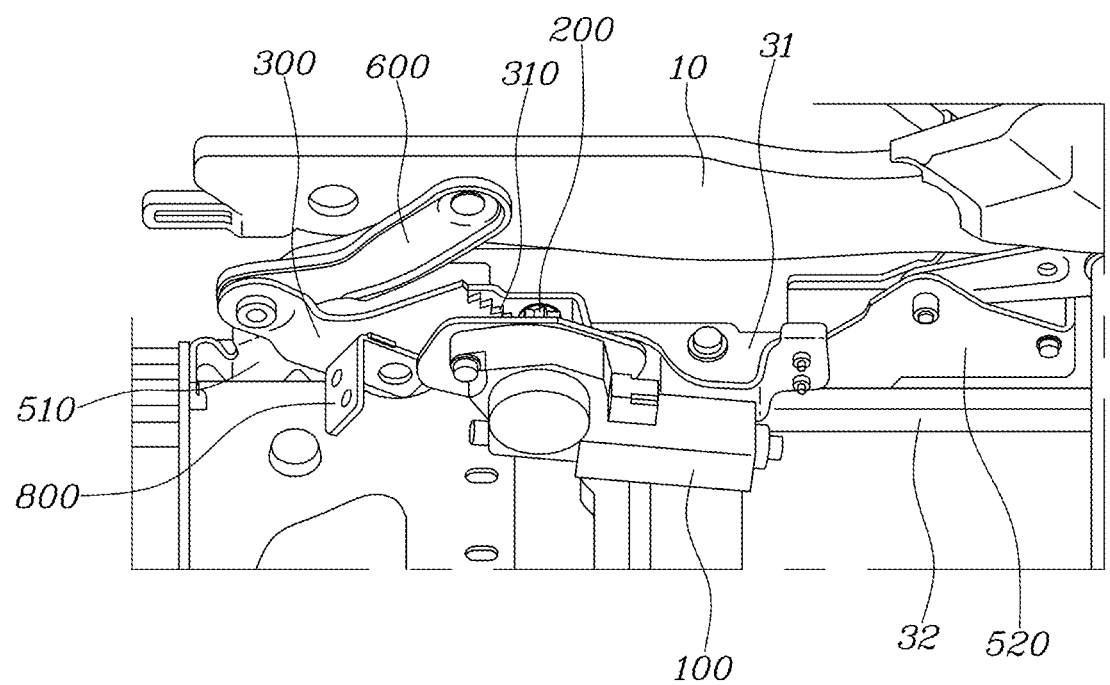
FIG. 5 is a diagram illustrating a state in which a connection bar is removed from FIG. 4.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments included in the present specification will be described in detail with reference to the accompanying drawings. The same reference numerals are provided to the same or similar components regardless of reference numerals, and a repetitive description thereof will be omitted.

As used herein, suffixes "module" and "portion" for a component of the present disclosure are used or interchangeably used solely for ease of preparation of the specification, and do not have different meanings and each thereof does not function by itself.

In the following description of embodiments of the present specification, when a detailed description of a known related art is determined to obscure the gist of the exemplary embodiments of the present specification, the detailed description thereof will be omitted herein.

Furthermore, the accompanying drawings are merely for easy understanding of the exemplary embodiments disclosed in the present specification, the technical spirit disclosed in the present specification is not limited by the accompanying drawings, and it should be understood to include all modifications, equivalents, and substitutes included in the spirit and scope of the present disclosure.

Terms including ordinal numbers such as first, second, and the like used herein may be used to describe various components, but the various components are not limited by these terms. The terms are used only for distinguishing one component from another component.

When a component is referred to as being "connected" or "coupled" to another component, the component may be directly connected or coupled to another component, but it should be understood that sill another component may be present between the component and another component.

On the other hand, when a component is referred to as being "directly connected" or "directly coupled" to another component, it should be understood that yet another component may not be present between the component and another component.

Unless the context clearly dictates otherwise, the singular form includes the plural form.

In the present specification, the terms "comprising," "having," or the like are used to specify that a feature, a number, a step, an operation, a component, an element, or a combination thereof described herein exists, and they do not preclude probability of the presence or addition of one or more other features, numbers, steps, operations, components, elements, or combinations thereof.

Furthermore, a unit or a control unit included in the names of a motor control unit (MCU), a hybrid control unit (HCU), and the like is a term widely used in the naming of a control device that is configured to control a specific vehicle function and does not refer to a generic function unit.

For example, a controller may include a communication device configured for communicating with other control units or sensors to control a responsible function, a memory for storing an operating system, a logic command, and input/output information, and one or more processors for performing determination, calculation, and decision which are necessary for controlling the responsible function.

Hereinafter, an apparatus of tilting a seat cushion of a vehicle according to exemplary embodiments of the present disclosure will be described with reference to the accompanying drawings.

As shown in FIGS. 1 to 7, the apparatus of tilting a seat cushion of a vehicle according to an exemplary embodiment of the present disclosure includes a tilting motor 100, a pinion gear 200, and a sector gear 300 configured to implement a tilting operation of the seat cushion and provided to be connected to left and right sides of a seat cushion frame 10, respectively. It is characterized in that, when the tilting motor 100 operates, the tilting operation of the seat cushion is implemented as a front end portion of the seat cushion frame 10 is rotated and vertically moved about a hinge shaft 20 at a rear side thereof.

That is, tilting motors 100 are positioned on the left and right sides of the front end portion of the seat cushion frame 10, and the two tilting motors 100 are each coupled to a motor bracket 400.

A front end portion and a rear end portion of the motor bracket 400 are coupled to a front set bracket 510 and a rear set bracket 520, respectively, and the front set bracket 510 and the rear set bracket 520 are coupled to a seat rail 30 to be spaced from each other in a front and rear direction thereof.

The seat rail 30 includes fixed rails 31 provided to extend from the left and right sides of the seat cushion frame 10 in the front and rear direction and fixed on a floor panel corresponding to a vehicle body, and moving rails 32 coupled to the fixed rails 31 and configured to be moved along the fixed rails 31 in the front and rear direction thereof.

The front set bracket 510 and the rear set bracket 520 are coupled to the moving rail 32 forming the seat rail 30 to be spaced from each other in the front and rear direction thereof.

The motor bracket 400 to which the tilting motor 100 is coupled is coupled to the front set bracket 510 and the rear set bracket 520, and the front set bracket 510 and the rear set bracket 520 are coupled to the seat rail 30 so that it is possible to secure a strong support structure using the motor bracket 400, the front set bracket 510, and the rear set bracket 520. Through the above structure, in the event of a collision in the front and rear direction, deformation due to the collision may be minimized with a strong supporting force so that there is an advantage of sufficiently securing passenger safety.

The two tilting motors 100 are coupled to the pinion gears 200, and the pinion gears 200 are engaged with the sector gears 300 on left and right sides of the seat cushion frame 10.

One end portion of the sector gear 300 is formed as an arc-shaped gear portion 310 so that the gear portion 310 is engaged with the pinion gear 200 in a form of an external gear.

Tilting links 600 are positioned on the left and right sides of the seat cushion frame 10, one end portion of the tilting link 600 is rotatably coupled to one end portion of the sector gear 300 by the medium of a link pin, and the other end portion of the tilting link 600 is rotatably coupled to a side surface of the seat cushion frame 10 by the medium of a link pin.

Therefore, when the tilting motor 100 is driven, the pinion gear 200, the sector gear 300, and the tilting link 600 are rotated, and the front end portion of the seat cushion frame 10 is rotated to be moved up and down about the rear hinge shaft 20 due to the rotation of the tilting link 600. Through the above operation, it is possible to implement the tilting operation of the seat cushion, and the accommodated passenger may take a rest in a comfortable posture such as a zero gravity neutral posture.

The exemplary embodiment of the present disclosure is configured so that the tilting motor 100, the pinion gear 200, the sector gear 300, and the tilting link 600, which perform the tilting operation of the seat cushion and exert a binding force in a tilted state of the seat cushion, are provided to be connected to both of one side and the other side of the seat cushion frame 10. In the present way, it is possible to achieve reinforcement of the binding force of the front portion of the seat cushion, and in the event of a collision, it is possible to prevent excessive lifting of the seat cushion and excessive rotation of the seatback. It is possible to prevent one-sided deformation of the seat cushion in the event of a collision so that there is an advantage of improving performance of preventing the passenger's neck injury and reducing the injuries of the passengers, securing the safety of passengers.

The exemplary embodiment of the present disclosure further includes a connection bar 700 which extends below the seat cushion frame 10 in the left and right direction and is provided so that both end portions connect the sector gears 300.

To minimize left and right torsion or a difference in revolutions per minute (rpm) between the two tilting motors 100 when the two tilting motors 100 positioned on the left and right sides of the seat cushion frame 10 are driven, the connection bar 700 is applied to connect the two sector gears 300.

Furthermore, when the two tilting motors 100 are driven, the connection bar 700 minimizes the left and right torsion, also minimizes the difference in revolutions per minute (rpm) between the two tilting motors 100, and has a purpose of maintaining an operation balancing of the sector gears 300 when the tilting motors 100 are operated. To the present end, the connection bar 700 is provided to be positioned between the two sector gears 300 positioned on the left and right sides of the seat cushion frame 10. Positions where both end portions of the connection bar 700 are coupled to the sector gears 300 may be the same position which is concentrically positioned.

It does not matter when an intermediate portion of the connection bar 700 is bent or an axis thereof is different, but it is a more preferable structure that the positions of both the end portions coupled to the sector gears 300 are concentrically the same position within the sector gear 300 to maintain the operation balancing of the sector gears 300.

To install the connection bar 700, connection bar mounting brackets 800 are fixedly coupled to internal side surfaces of the sector gears 300, and both the end portions of the connection bar 700 are fixedly coupled to the connection bar mounting brackets 800.

One end portions of the connection bar mounting brackets 800 may be engaged and fixed to internal side surfaces of the sector gears 300 through bolts or may be fixed thereto by welding, and the other end portions of the connection bar mounting brackets 800 and both the end portions of the connection bar 700 may be coupled and fixed through bolt engagement or may be fixed by welding.

Alternatively, both the end portions of the connection bar 700 may be directly engaged and fixed to the side surfaces of the sector gears 300 through bolts or may be fixed thereto by welding.

Figure 6:
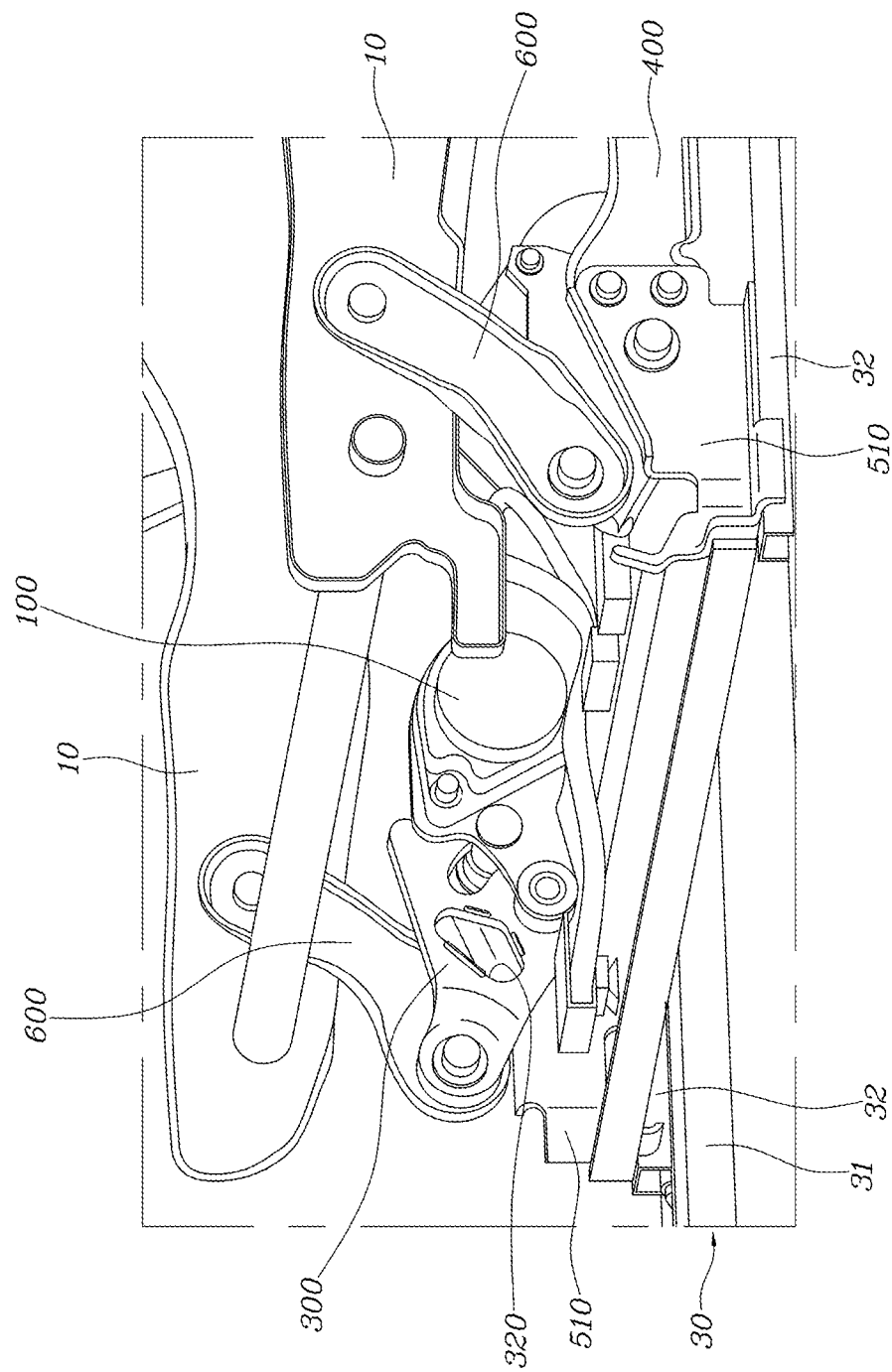
FIG. 6 and FIG. 7 are a diagram illustrating a state in which connection bar coupling holes are formed in a sector gear and a diagram illustrating a state in which both end portions of the connection bar are inserted into and coupled to the connection bar coupling holes according to an exemplary embodiment of the present disclosure.
Figure 7:
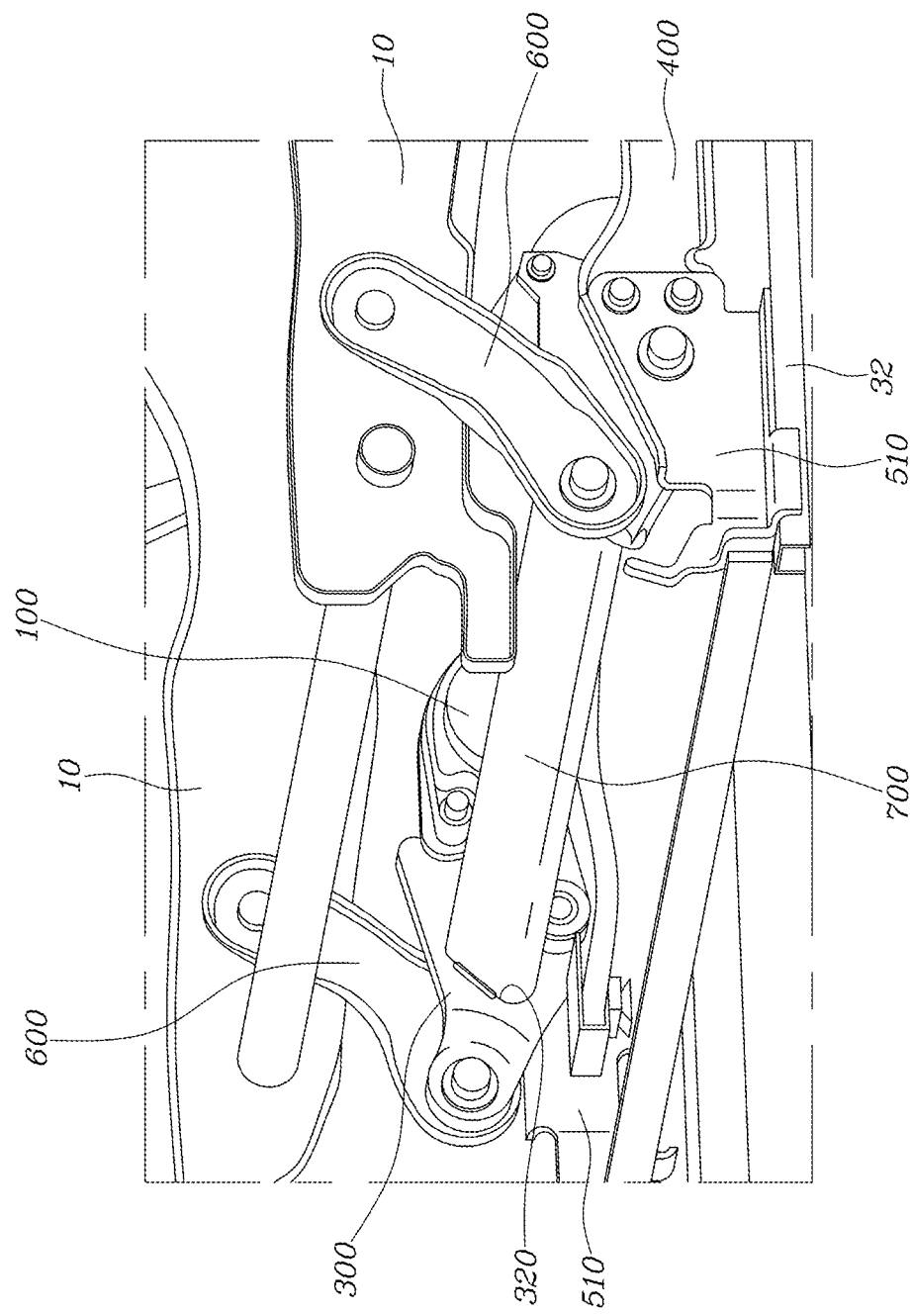

As an exemplary embodiment of the present disclosure, as shown in FIG. 6 and FIG. 7, connection bar coupling holes 320 passing through the sector gears 300 in the left and right direction may be formed, and both end portions of the connection bar 700 may be inserted into the connection bar coupling holes 320 to form a structure coupled to the sector gears 300.

Both the end portions of the connection bar 700 are inserted into the connection bar coupling holes 320 and then the connection bar 700 and the connection bar coupling holes 320 may be fixedly coupled to each other through welding.

As described above, the apparatus of tilting a seat cushion of a vehicle according to an exemplary embodiment of the present disclosure has a configuration in which the tilting motor 100, the pinion gear 200, the sector gear 300, and the tilting link 600, which perform the tilting operation of the seat cushion and exert a binding force in a tilted state of the seat cushion are provided to be connected to both of one side and the other side of the seat cushion frame 10. In the present way, it is possible to achieve reinforcement of the binding force of the front portion of the seat cushion, and in the event of a collision, it is possible to prevent excessive lifting of the seat cushion and excessive rotation of the seatback. It is possible to prevent one-sided deformation of the seat cushion in the event of a collision so that there is an advantage of improving performance of preventing the passenger's neck injury and reducing the injuries of the passengers, securing the safety of passengers.

Furthermore, according to the exemplary embodiments of the present disclosure, the motor bracket 400 to which the tilting motor 100 is coupled is coupled to the front set bracket 510 and the rear set bracket 520, and the front set bracket 510 and the rear set bracket 520 are coupled to the seat rail 30 so that it is possible to secure a strong support structure using the motor bracket 400, the front set bracket 510, and the rear set bracket 520. Through the above structure, in the event of a collision in the front and rear direction, deformation due to the collision may be minimized with a strong supporting force so that there is an advantage of sufficiently securing passenger safety.

Furthermore, the exemplary embodiment of the present disclosure has a configuration in which the two sector gears 300 positioned on the left and right sides of the seat cushion frame 10 are connected to each other by the connection bar 700. By use of the connection bar 700, it is possible to minimize left and right torsion when the two tilting motors 100 are driven, and minimize the difference in revolutions per minute (rpm) between the two tilting motors 100. When the tilting motors 100 are operated, it is possible to maintain the operation balancing of the sector gears 300 so that there is an advantage in that the safety of the operation is secured.

In accordance with an apparatus of tilting a seat cushion of a vehicle according to an exemplary embodiment of the present disclosure, there is provided a configuration in which a tilting motor, a pinion gear, a sector gear, and a tilting link, which perform a tilting operation of a seat cushion and exert a binding force in a tilted state of the seat cushion are provided to be connected to both of one side and the other side of a seat cushion frame. In the present way, it is possible to achieve reinforcement of a binding force of a front portion of the seat cushion, and in the event of a collision, it is possible to prevent excessive lifting of the seat cushion and excessive rotation of a seatback. It is possible to prevent one-sided deformation of the seat cushion in the event of a collision so that there is an effect of improving performance of preventing the passenger's neck injury and reducing the injuries of the passengers, securing the safety of passengers.

Furthermore, according to the exemplary embodiments of the present disclosure, the motor bracket to which the tilting motor is coupled is coupled to a front set bracket and a rear set bracket, and the front set bracket and the rear set bracket are coupled to a seat rail so that it is possible to secure a strong support structure using the motor bracket, the front set bracket, and the rear set bracket. Through the above structure, in the event of a collision in a front and rear direction, deformation due to the collision may be minimized with a strong supporting force so that there is an effect of sufficiently securing passenger safety.

Furthermore, in accordance with the exemplary embodiments according to an exemplary embodiment of the present disclosure, there is provided a configuration in which two sector gears positioned on left and right sides of the seat cushion frame are connected to each other by a connection bar. By use of the connection bar, it is possible to minimize left and right torsion when the two tilting motors are driven, and minimize a difference in revolutions per minute (rpm) between the two tilting motors. When the tilting motors are operated, it is possible to maintain an operation balancing of the sector gears so that the there is an effect in that the safety of the operation may be secured.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus of tilting a seat cushion of a vehicle, the apparatus comprising:
a tilting motor, a pinion gear coupled to the tilting motor, and a sector gear engaged to the pinion gear, wherein the tilting motor, the pinion gear, and the sector gear are configured to implement a tilting operation of the seat cushion and are provided to be connected to left and right sides of a seat cushion frame, respectively,
wherein, when the tilting motor is operated, a tilting operation of the seat cushion is implemented as a front end portion of the seat cushion frame is rotated to be moved up and down about a rear hinge shaft disposed at a rear side of the seat cushion frame,
wherein the pinion gear is coupled to the tilting motor positioned on each of the left and right sides of the seat cushion frame, and
wherein the sector gear is engaged with the pinion gear on each of the left and right sides of the seat cushion frame.

2. The apparatus of claim 1, further including:
a motor bracket, a front set bracket, a rear set bracket, and a seat rail,
wherein the tilting motor is in plural,
wherein the tilting motors are positioned on each of the left and right sides of the seat cushion frame, respectively and are coupled to the motor bracket,
wherein the motor bracket is coupled to the front set bracket and the rear set bracket in a front and rear direction of the vehicle, and wherein the front set bracket and the rear set bracket are coupled to the seat rail to be spaced from each other in the front and rear direction.

3. The apparatus of claim 1, further including:
a pair of tilting links rotatably connecting the sector gear to the seat cushion frame on the left and right sides of the seat cushion frame.

4. The apparatus of claim 1, wherein the sector gear is in plural, and wherein the apparatus further includes:
a connection bar extending below the seat cushion frame in a left and right direction of the seat cushion and including first and second end portions provided to connect the sector gears.

5. The apparatus of claim 4,
wherein the sector gears include a first sector gear and a second sector gear, and
wherein the connection bar is provided between the first sector gear and the second sector gear positioned on the left and right sides of the seat cushion frame.

6. The apparatus of claim 5, wherein positions where the first and second end portions of the connection bar are coupled to the sector gears are a concentrically same position.

7. The apparatus of claim 4,
wherein a connection bar mounting bracket is fixedly coupled to an internal side surface of the sector gears; and
wherein the first and second end portions of the connection bar are fixedly coupled to the connection bar mounting bracket.

8. The apparatus of claim 4,
wherein a connection bar coupling hole is formed to pass through the sector gears in the left and right direction, and
wherein the first and second end portions of the connection bar are inserted into the connection bar coupling hole to be engaged with the sector gears.

9. An apparatus of tilting a seat cushion of a vehicle, the apparatus comprising:
a tilting motor, a pinion gear coupled to the tilting motor, and a sector gear engaged to the pinion gear, wherein the tilting motor, the pinion gear, and the sector gear are configured to implement a tilting operation of the seat cushion and are provided to be connected to left and right sides of a seat cushion frame, respectively,
wherein, when the tilting motor is operated, a tilting operation of the seat cushion is implemented as a front end portion of the seat cushion frame is rotated to be moved up and down about a rear hinge shaft disposed at a rear side of the seat cushion frame, and
wherein the apparatus further includes a motor bracket, a front set bracket, a rear set bracket, and a seat rail,
wherein the tilting motor is in plural,
wherein the tilting motors are positioned on each of the left and right sides of the seat cushion frame, respectively and are coupled to the motor bracket,
wherein the motor bracket is coupled to the front set bracket and the rear set bracket in a front and rear direction of the vehicle, and
wherein the front set bracket and the rear set bracket are coupled to the seat rail to be spaced from each other in the front and rear direction.

10. An apparatus of tilting a seat cushion of a vehicle, the apparatus comprising:
a tilting motor, a pinion gear coupled to the tilting motor, and a sector gear engaged to the pinion gear, wherein the tilting motor, the pinion gear, and the sector gear are configured to implement a tilting operation of the seat cushion and are provided to be connected to left and right sides of a seat cushion frame, respectively,
wherein, when the tilting motor is operated, a tilting operation of the seat cushion is implemented as a front end portion of the seat cushion frame is rotated to be moved up and down about a rear hinge shaft disposed at a rear side of the seat cushion frame, wherein the sector gear is in plural, and
wherein the apparatus further includes a connection bar extending below the seat cushion frame in a left and right direction of the seat cushion and including first and second end portions provided to connect the sector gears,
wherein a connection bar mounting bracket is fixedly coupled to an internal side surface of the sector gears; and
wherein the first and second end portions of the connection bar are fixedly coupled to the connection bar mounting bracket.

* * * * *